(No Model.) 2 Sheets—Sheet 1.
T. W. GOAD.
GEODETIC ALTAZIMUTH.
No. 459,455. Patented Sept. 15, 1891.
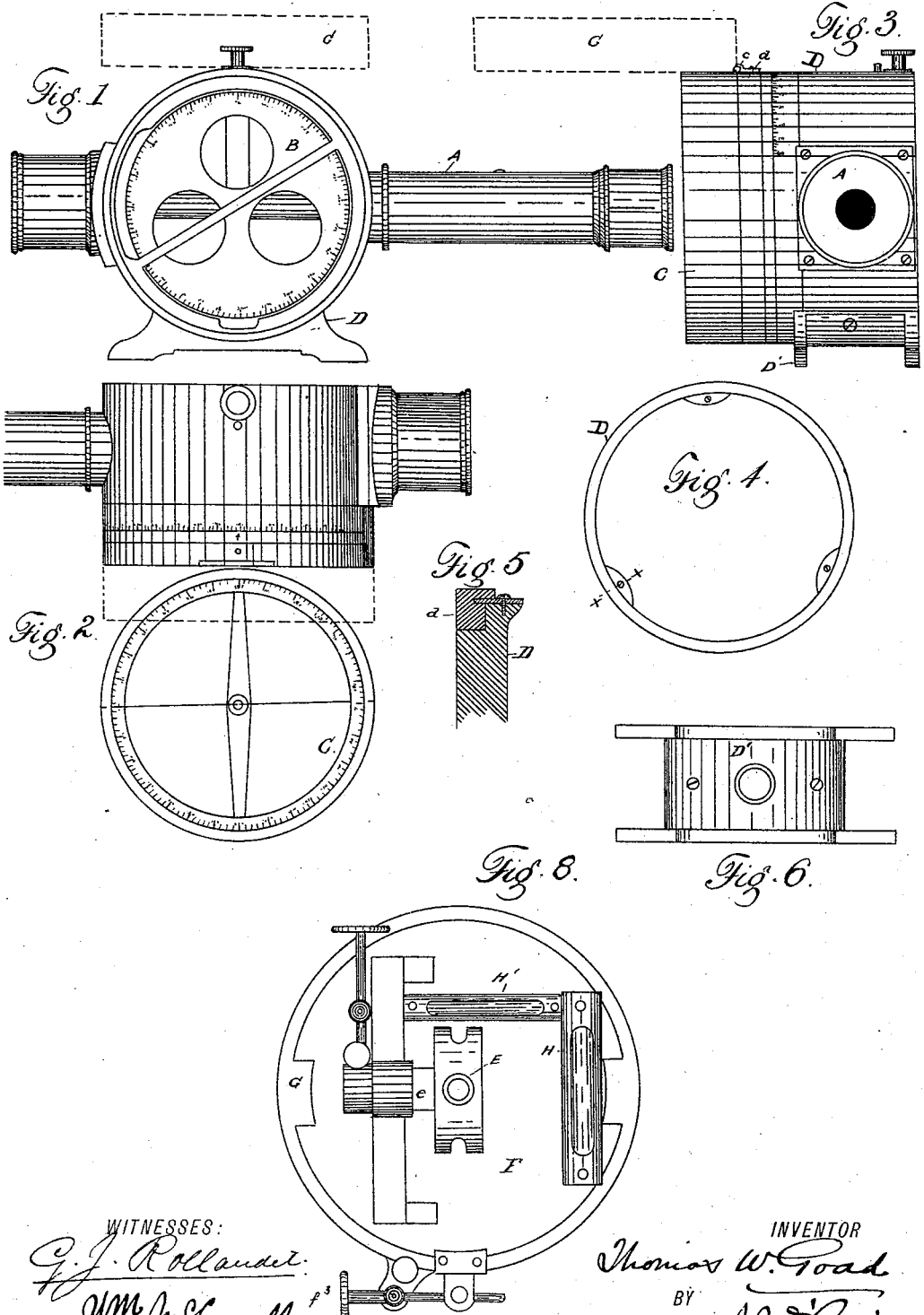
WITNESSES:
G. J. Rollander
Wm. McConnell
INVENTOR
Thomas W. Goad
BY
A. J. O'Brien
ATTORNEY.

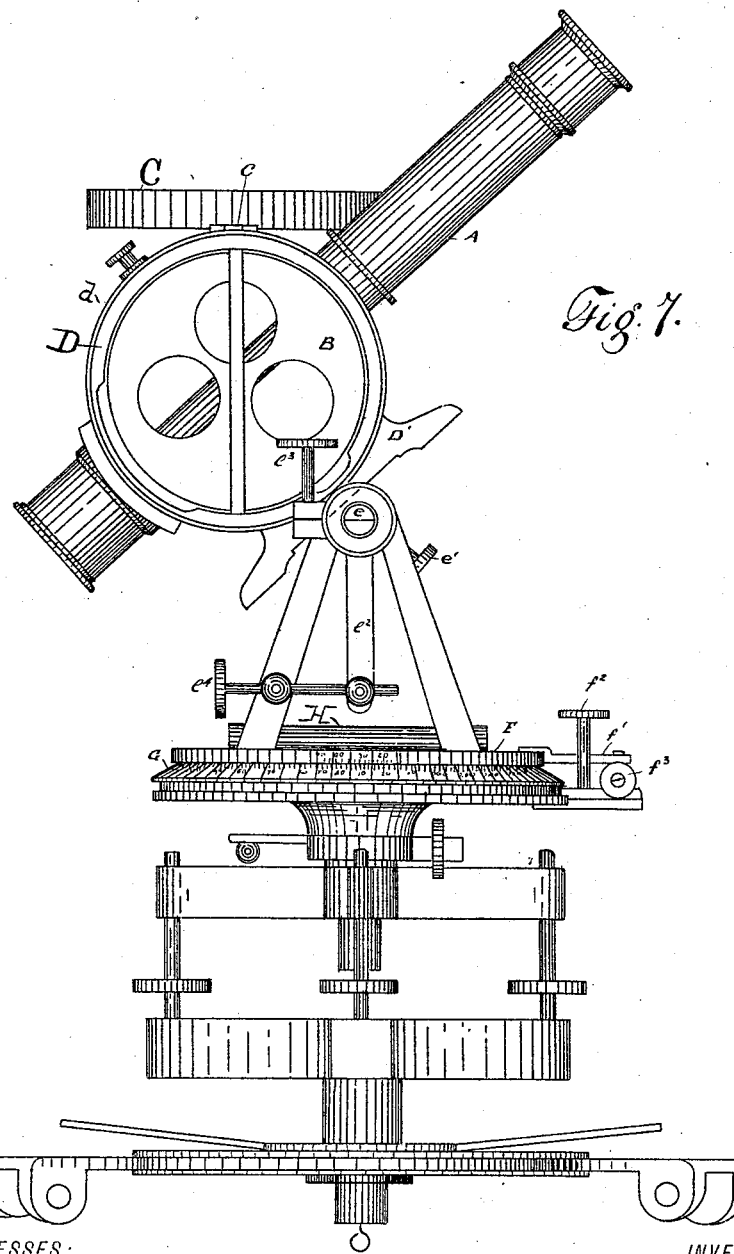

UNITED STATES PATENT OFFICE.

THOMAS W. GOAD, OF DENVER, COLORADO.

GEODETIC ALTAZIMUTH.

SPECIFICATION forming part of Letters Patent No. 459,455, dated September 15, 1891.

Application filed January 24, 1891. Serial No. 378,929. (No model.)

*To all whom it may concern:*

Be it known that I, THOMAS W. GOAD, a subject of the Queen of Great Britain, residing at Denver, in the county of Arapahoe and State of Colorado, have invented certain new and useful Improvements in Geodetic Altazimuths; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improved surveying-instrument adapted for use as a hand-instrument in reconnaissance or exploring work when great precision is not required, and also for surveys requiring great precision either on the surface or in underground mines or other workings.

The invention consists of an improved altazimuth usable alone, as above mentioned, for exploring work, and in the combination thereof, with the horizontal limb or circle, of a theodolite, whereby to insure precision of the readings necessarry for more accurate work. The ordinary pocket-altazimuth comprises a combined telescope-clinometer and azimuth-compass for ascertaining angles in altitude and in azimuth, the clinometer and compass being contained within the opposite sides of a box or drum traversed diametrically by the telescope.

In using this instrument the drum must be in a vertical plane for ascertaining angles in altitude and in a horizontal plane for ascertaining angles in azimuth, and it is necessary after sighting the station to turn the instrument from the one to the other position in order to ascertain the combined angle or true bearing when the station sighted is not on the same plane with the telescope. This alteration of the position of the instrument is apt to cause considerable error in the observation; and the object of this invention is, while retaining the portable form of the ordinary altazimuth, to enable the compass to be accurately adjusted with reference to the clinometer or otherwise to the horizontal position for the swinging of the compass-card and while the telescope is held at any angle of elevation or depression, so that both vertical and horizontal angles may be ascertained without altering the position of the instrument. For this purpose the compass-box is so connected with the clinometer-drum that it can either be folded flat against the end of the same or turned to a position in which the axis of the compass is so mounted that it may be rotated about the axis of the clinometer, a circle graduated to correspond to the clinometer-scale being provided to enable the compass to be adjusted to a horizontal position with reference to the reading of the clinometer.

My improved device will be fully understood by reference to the accompanying drawings, in which—

Figure 1 is a side view of the altazimuth, the horizontal position of the compass-box being shown in dotted lines. Fig. 2 is a plan view of the same with the compass raised, the closed position being shown in dotted lines. Fig. 3 is a front view of the altazimuth, the raised position of the compass being shown in dotted lines. Fig. 4 is a rear view of the clinometer-drum, showing also the movable ring to which the compass is hinged, the compass-box being detached from the ring. Fig. 5 is a detail section taken on the line $xx$, Fig. 4, showing the manner of joining the compass-ring and the clinometer-drum. Fig. 6 is an underneath view of the foot of the clinometer-drum. Fig. 7 is an elevation of the altazimuth combined with the theodolite limb and stand for precise work. Fig. 8 is a plan view of the theodolite-limb with the altazimuth removed.

In the views wherein similar reference-characters designate corresponding parts or elements of the mechanism, let A designate the telescope, and B the clinometer, both constructed and combined in the ordinary way.

C is the compass, hinged at $c$ to a ring $d$, so connected, as shown in detail in Fig. 5, to the drum D as to be revoluble stiffly thereon about its axis and provided with an index moving upon a scale upon the periphery divided to correspond to the divisions of the clinometer. The compass-box when turned down upon its hinge closes snugly against the ring $d$, and so occupies no more room than the ordinary altazimuth.

The clinometer-drum is provided with the usual foot D' for the application to a straight-edge and adapted (when an instrument of precision is required) to be clamped to a cradle E, carried by a horizontal axis $e$, mounted on the alidade F, movable about a vertical axis over a graduated horizontal circle G, resembling the lower limb of a transit-theodolite. Any suitable form of connection may be adopted which permits the easy and secured attachment and removal of the instrument. In the example shown in the drawings a simple binding-screw $e'$ is used. The axis $e$ of the cradle is provided with an arm $e^2$, adapted to be clamped to it by a screw $e^3$, said arm being regulated by a micrometer-screw $e^4$ for fine adjustment in altitude. Upon the base of the alidade F are mounted the levels H and H', and for fine adjustment in azimuth a clamp $f'$ is adapted by means of a screw $f^2$ to grip the edge of the graduated plate G at any point and carries a micrometer-screw $f^3$, working in a nut carried by an arm fixed to the base of the alidade F. A similar clamp and micrometer-screw connects the axis of the plate with the leveling-frame, in which it is mounted and provided with levels, adjusting-screws, and means of attachment to a tripod-stand. The instrument may thus be used as a portable hand-instrument of precision for reading the curves, stadia, distances, and angles of elevation or depression at the same time.

Having thus described my invention, what I claim is—

1. A pocket-altazimuth in which the compass is so mounted on the clinometer-drum that its axis may either coincide with the clinometer-axis or be placed perpendicular thereto and be rotated about the latter, as and for the purpose set forth.

2. A pocket-altazimuth in which the compass is hinged to a ring connected to and revoluble upon the clinometer-drum and provided with a scale graduated to correspond to that of the clinometer, substantially as specified.

3. The combination of the herein-described altazimuth with the lower and horizontal limb and stand of a theodolite, the connection of the altazimuth with the mounting being such as to admit of its being readily detached for separate use as a hand-instrument, substantially as specified.

In testimony whereof I affix my signature in presence of two witnesses.

THOMAS W. GOAD.

Witnesses:
WM. MCCONNELL,
F. H. JOHNSON.